June 19, 1962 E. W. MEHAL 3,039,755
APPARATUS FOR REDUCTION OF ARSENIC TRICHLORIDE
TO ELEMENTAL ARSENIC
Filed Dec. 6, 1960

INVENTOR
EDWARD W. MEHAL
BY Stevens, Davis, Miller & Mosher
ATTORNEYS

United States Patent Office 3,039,755
Patented June 19, 1962

3,039,755
APPARATUS FOR REDUCTION OF ARSENIC TRICHLORIDE TO ELEMENTAL ARSENIC
Edward W. Mehal, Dallas, Tex., assignor to Texas Instruments Incorporated, Dallas, Tex., a corporation of Delaware
Filed Dec. 6, 1960, Ser. No. 74,205
9 Claims. (Cl. 266—19)

This invention relates to an apparatus for preparing ultra high purity arsenic. More particularly, the invention relates to an apparatus for reducing arsenic trichloride to elemental arsenic by reaction with molecular hydrogen.

The apparatus of the present invention comprises an improvement over the apparatus disclosed in a copending application, Serial No. 74,204, entitled "Method and Apparatus for Reduction of Arsenic Trichloride to Elemental Arsenic" filed December 6, 1960, by Frederick G. Kennedy, Edward W. Mehal, Robert J. Patterson, and John W. Ross, and assigned to the assignee of this application.

In the fabrication of semiconductor devices, purity of all materials utilized is of utmost importance and levels of impurity in semiconductor materials often must be kept to the order of several parts per million and below.

In addition to the most commonly used types of semiconductor materials, germanium and silicon, compounds of various elements find usage and semiconductor devices depending upon the characteristics and function sought to be achieved. One type of such compound used is gallium arsenide.

It is in the preparation of ultra high purity arsenic for use either as a semiconductor impurity or in compounding gallium arsenide or other arsenical compounds of suitable quality for semiconductor use that the present invention finds particular application.

It is well known that the oxides and halides of many metals may be reduced to the elemental metal by reaction with hydrogen concurrently with the application of heat. Generally, in such redox reactions the hydrogen is oxidized to water or to the applicable hydrogen halide and is easily separated from the elemental metal which is usually deposited on the walls of the apparatus through which the hydrogen stream is passed.

At ordinary or room temperatures, arsenic compounds are not reduced so as to yield elementary metallic arsenic. However, at a low red heat, and at higher temperatures, arsenical compounds are very prone to undergo reduction to the metallic state, and at these temperatures almost all such compounds will evolve gaseous metallic arsenic when they are subjected to the heat in a reducing atmosphere. Since arsenic metal sublimes or passes into the vapor state without first melting the vapor may then be cooled to yield a solid, the appearance of which varies according to the physical conditions to which it is subjected.

A brief consideration of the properties of the solid metallic arsenic will be helpful in understanding and appreciating the requirements of any apparatus which is to be used in condensing arsenic vapor and collecting the solid element. First, the arsenic sublimation point is approximately 610° C.; therefore, of course, the vapors must be cooled below this temperature in order to deposit the solid material.

Although the metallic arsenic in its solid state is very hard, it is brittle and may be powdered to some extent. However, difficulty is experienced in removing the solid metallic arsenic from the container or vessel in which the vapor is sublimed without contamination and usually the removal process or apparatus is quite involved.

The properties of arsenic to some extent also influence the selection of the reducing atmosphere to be used in reducing its compounds to the metallic state since it is not feasible to completely isolate the area of the sublimation of arsenic vapor from the area where the actual reduction of the compound takes place.

Thus, since metallic arsenic appears to combine with any oxygen which may be present in aqueous solution, moisture and oxygen must be eliminated from the reducing atmosphere to the maximum extent possible in order to yield high purity arsenic uncontaminated by the oxides of the metal.

Further, arsenic does not combine directly with molecular hydrogen so that if this frequently used reducing agent is suitable in other respects for the reduction of arsenic compounds, no objection to its use can be founded upon its tendency to combine with the deposited metallic arsenic.

Having reviewed the properties of arsenic which form the basis for many of the principles utilized in the present invention, the next consideration is the type of reduction reaction which is carried out in the novel apparatus of our invention.

When subjected to sufficient heat, arsenic trichloride vapor reacts with molecular hydrogen with arsenic depositing on the walls of the containing vessel. The reaction which takes places is $2AsCl_3 + 3H_2 = 2As + 6HCl$.

This redox reaction suggests itself as a desirable one for producing elemental arsenic since the substances utilized are inexpensive and easily obtained.

The arsenic trichloride to be used in the redox reaction carried out in the present invention is easily obtained, and since it is the only chloride of arsenic which has been isolated or appears to exist, indications are that it is reduced directly to metallic arsenic without the intermediate reduction to a lower valence chloride. Experimental data confirms this fact.

The only real disadvantage in the use of arsenic trichloride as the arsenic compound to be reduced results from its extremely toxic nature and considerable care must be exercised in handling it.

The apparatus of the present invention is designed for quickly and easily reducing $AsCl_3$ to elemental arsenic in an environment which permits the recovery of near theoretical yields of ultra high purity arsenic metal.

Broadly, the invention comprises an apparatus including means for purifying commercial hydrogen to a high state of purity, introducing liquid arsenic chloride into the stream of purified hydrogen where it is vaporized by the application of heat introducing the mixture of hydrogen and arsenic trichloride into a cylindrical reaction tube, and heating the reaction tube to a high temperature to promote the reduction reaction. The reaction tube is divided into three zones which may be called the reaction zone and the first and second temperature zones. The hydrogen and arsenic trichloride are reacted in the reaction zone and the exhaust gases from the reaction are then passed successively into the first and second temperature zones.

To facilitate the removal of the solidified arsenic from the reaction tube, a deposition tube of smaller diameter than that of the reaction tube is inserted inside the reaction tube and extends to a position just downstream from the high temperature reaction zone coextensive with the first and second temperature zones. A funnel-shaped projection integral with the walls of the reaction tube and tapering inwardly towards the longitudinal axis of the tube extends into the opening in the deposition tube and serves to lead the reaction gases from the reaction chamber into the deposition tube. Upon reaching the cooler temperature zones present in the deposition tube, the arsenic vapors sublime; i.e., the metal passes directly from the gaseous to the solid state in which form it is deposited upon the walls of the deposition tube.

The exhaust gases from the reactor, substantially free of arsenic, are passed through a filter to remove any powdered arsenic which may be entrained, and then to a water scrubber to remove HCl formed in the reaction, and any unreacted $AsCl_3$. The residual unreacted hydrogen may be recirculated or passed to a burn-off and vent. After a run has been completed and the desired amount of arsenic has been deposited, the deposition tube is removed from the reaction tube and the high purity metal is removed therefrom.

In the invention means have been provided to produce even higher purity arsenic than is obtained in the apparatus disclosed in the above discussed copending application.

The deposition tube of the copending application consists of a one piece cylindrical tube, hence the solid arsenic must be extracted from one end or the other. Although arsenic does not adhere to the walls of the deposition tube when it is made of quartz, irregularities in the surface of the deposition tube prevent the solid arsenic from sliding freely in a longitudinal direction out of the deposition tube. Also, inasmuch as the reaction tube used a graphite sealing plug which may contain a host of impurities such as iron, copper, selenium, calcium, sodium, etc., which could conceivably contaminate the arsenic, a reaction tube which eliminated the necessity for such a graphite plug would be highly desirable. Moreover, if the elemental arsenic is to be used in compounding semiconductor materials such as gallium arsenide, the arsenic must be of extreme purity; therefore, since carbon may act as a dopant of such materials, it is essential that deposited arsenic be kept as carbon free as possible.

One embodiment of the invention utilizes a deposition tube that is split longitudinally into two separate halves which are held together inside the reaction tube with two graphite liners which are located to minimize contamination of deposited arsenic. Such a longitudinally split deposition tube provides removability of the arsenic without sacrificing the deposition tube inasmuch as the problem of the copending application is not that the arsenic sticks to the quartz, but that it is blocked by the irregularities of the quartz tube; hence, in this embodiment of the invention the deposition tube is simply removed and the two halves separated. Moreover, this embodiment of the present invention provides re-useability of the quartz deposition tube.

Another embodiment of the invention, which is the preferred embodiment, is a deposition tube which is not split completely into two separate halves, but instead a circumferential longitudinal section of the cylindrical tube is cut away and used as a cap for the tube. This type of tube is more easily handled and requires no graphite liners within the reaction tube to hold the parts together. This preferred embodiment of the present invention overcomes the very remote possibility of contamination inherent in the first-mentioned embodiment by eliminating the graphite liners which might introduce extremely small quantities of impurities into the deposited arsenic.

Another advantage of the invention over the apparatus disclosed in the copending application is the provision of an exhaust gas conduit which is so shaped as to form a close seal with a cooperatively shaped end of the reaction tube, while still permitting easy separation when it is desired to remove the deposition tube from within the reaction tube. The copending application employs a graphite plug to seal the end of the reaction tube, and thereby introduces a danger of contamination discussed hereinbefore.

The elemental arsenic produced in the apparatus described is of very high purity and eminently suited for compounding semiconductor materials. It is accordingly a major object of this invention to provide an apparatus which may be employed to produce ultra high purity arsenic.

It is a further object of this invention to provide an apparatus which is inexpensive and simple of construction and which is capable of producing elemental arsenic from readily obtainable and inexpensive raw materials.

It is a further object of this invention to provide an apparatus which permits the recovery of near theoretical yields of elemental arsenic produced by reducing arsenic trichloride with hydrogen.

Another object of this invention is to provide an apparatus which facilitates the rapid and complete removal of elemental arsenic from a cylindrical tube in which it has been deposited in lump and powder form.

It is a further object of this invention to provide an apparatus which avoids the use of carbon elements so as to eliminate the possibility of contaminating freshly formed elemental arsenic by said carbon or impurities in the carbon elements.

Further objects and advantages of this invention will become apparent as the following description proceeds, and the features of novelty which characterize this invention will be pointed out with particularity in the claims annexed to and forming a part of this invention.

For a better understanding of the invention, reference may be had to the following detailed description taken in connection with the accompanying drawings in which:

FIGURE 1 shows a front sectional view of the apparatus used in carrying out the reduction of arsenic trichloride with hydrogen to produce pure elemental arsenic;

FIGURE 2 is a perspective view of the deposition tube comprising a component of the apparatus of this invention, showing the two parts of the tube in disassembled relation; and FIGURE 3 is a perspective view of a deposition tube comprising a component of the apparatus as another embodiment of this invention, showing the two parts of the longitudinally split tube.

In FIGURE 1, the purification of a stream of commercial hydrogen is illustrated schematically. The hydrogen is first passed through a chamber 1 containing copper turnings where entrained $SO_3$, $H_2S$, and $SO_2$ are converted to copper sulfide, sulfites, sulfate, and hydrogen. The hydrogen next passes through a standard catalytic deoxygenation unit 2 where any oxygen present is removed, then through a pair of molecular sieve units designated 3 and 4 where it is dried and further purified. The second molecular sieve unit 4 may be cooled by Dry Ice for more efficient removal of any residual moisture remaining in the hydrogen stream. The hydrogen is finally passed through a chamber 5 containing charcoal cooled by liquid nitrogen where it undergoes final drying and purification.

After the hydrogen has been purified by passage through the purification portion of the apparatus, it is fed to the intake end 7 of a quartz reaction tube, designated generally 6. The supply of arsenic trichloride is contained in a volumetric dripper 8 located above the intake end of the reaction tube. A controlled amount of arsenic trichloride is allowed to pass from the dripper into the reaction tube and mixes with the hydrogen near the entrance to the reaction tube. An electrical heating tape 9 is wrapped around the reaction tube at the point where the liquid arsenic trichloride mixes with the stream of purified hydrogen and this portion of the reaction tube is maintained above the boiling point of the arsenic trichloride, preferably at about 150° C.

The reaction tube 6 is divided according to function into three sections which may be designated the reaction zone 16, the first temperature zone 17, and the second temperature zone 18. Heating elements 10 surround the reaction zone 16. These elements are heated to a high temperature so that the temperature in the reaction zone 16 is maintained at approximately 1100° C. Disposed about the first temperature zone 17 of the reaction tube 6 is another heating element 12 which provides a temperature of approximately 450° C. in the first temperature zone. The second temperature zone 18, which is heated to about 200° C., is surrounded by electrical heating element 14.

Disposed within the quartz reaction tube 6, and approximately coextensive with that portion of the reaction tube which defines the first and second temperature zones, is a deposition tube 19 of slightly lesser diameter than that of the reaction tube. The deposition tube, like the reaction tube, is made of quartz and is constructed in two parts for easy removal of the deposited arsenic.

The preferred embodiment of this two part deposition tube 19 may be better understood by referring to FIGURE 2, which shows the deposition tube to be made of a larger cylindrical section 19a and a cap 19b which is a circumferential longitudinal segment of the complete cylinder. Quartz tabs 19c are fused to the outer side of the larger cylindrical section 19a and assist in holding the cap 19b in place.

In the operation of the apparatus, the two semi-cylindrical parts of the deposition tube 19 are joined together to form a cylinder and the tube is inserted in reaction tube 6 in the manner shown in FIGURE 1. At its upstream end, that is, at that end which lies in the first temperature zone of the reaction tube, the deposition tube 19 fits over the stem of a funnel-shaped projection 27 which is integral with and projects from the sides of the reaction tube 6. Reference numeral 20 indicates a quartz spacer bead which holds the tube 19 in spaced position within reaction tube 6.

The right end of reaction tube 6 is provided with convex flanges indicated by reference numeral 21. These flanges fit within concave flanges 22 to form a seal between the reaction tube 6 and an exhaust gas conduit denoted by reference numeral 23. This right angle conduit 23 is connected at its other end (ground to make a tight seal) with a double necked distillation flask 24.

The flask 24 contains a wad or mass of pyrex wool 25 which functions to remove any powdered arsenic which may be entrained in the exhaust gases from the reaction. After passing through the flask 24 the exhaust gases from the reaction pass into a water scrubber designated 26 where hydrogen chloride formed in the reaction and any unreacted arsenic trichloride are removed. The remainder of the exhaust gas will be substantially hydrogen which was not consumed in the reaction. This hydrogen may be purified and recirculated to the reactor or may be circulated to a burn-off station.

In FIGURE 3 another embodiment of the present invention is illustrated. In this embodiment deposition tube 30 is shown as consisting of two semicylindrical parts, 30a and 30b. When deposition tube 30 is used, the same apparatus as shown in FIGURE 1 is utilized, except instead of quartz spacer bead 20, two graphite rings (not illustrated) surround the semicylindrical parts 30a and 30b holding deposition tube 30 together as one part. This provides annular support for deposition tube 30 when it is used instead to replace the deposition tube 19 of FIGURE 1.

Having pointed out and described the various elements of the apparatus making up this invention, a description of the operation of the apparatus will now be presented.

The hydrogen used in the reduction reaction requires careful control. Arsenic trichloride hydrolizes easily and traces of water must be removed from the hydrogen stream to avoid the undesirable loss of $AsCl_3$. Also oxygen must be carefully removed to prevent formation of arsenic oxides. A further impurity to be avoided is hydrogen sulfide. As a consequence, the hydrogen used for reduction must be purified and dried.

After being purified, the hydrogen is ready for introduction into the reaction zone in controlled amounts. For the purpose of closely and accurately controlling the flow rate of the hydrogen through the reactor, a flow meter 29 is provided.

The hydrogen enters quartz reaction tube 6 at its intake end 7 and there is mixed with arsenic trichloride which is introduced in controlled quantity from the volumetric dripper 8. An electrical heating tape 9 is wrapped around the reaction tube 6 closely adjacent its intake end and that portion of the tube is heated above the boiling point of the arsenic chloride, i.e., 130° C. In order to secure substantially instantaneous vaporization of the liquid chloride as it falls into the moving hydrogen stream, a temperature of approximately 150° C. is preferred.

Immediately after the arsenic trichloride is introduced into the stream of hydrogen, the gaseous mixture passes into the reaction zone 16 of tube 6. The temperature of this zone is maintained at approximately 1100° C. by the surrounding heating element 10. At this temperature, the reduction reaction, $2AsCl_3+3H_2=2As+6HCl$, proceeds quite rapidly, with gaseous arsenic and hydrogen chloride being the products formed.

In the practice of this invention, good results have been obtained using a reaction tube 6 which defines a reaction zone and two temperature zones, each of which are approximately 12 inches in length and 1.77 inches in diameter. However, the dimensions of the reaction tube 6 may be varied considerably within such limitations as may be imposed by requirements for temperature differential throughout the length of the tube which will be presently explained.

After the hydrogen and arsenic chloride have reacted in reaction zone 16, the gaseous reaction products plus any residual arsenic chloride and hydrogen not consumed in the reaction are carried by the moving gaseous stream through the funnel-shaped projection 27 and into the first temperature zone 17 in the quartz deposition tube 19. The gas stream flow rate is sufficient to maintain a decreasing temperature gradient from the reaction zone through the deposition tube.

The temperature of the first temperature zone 17 is approximately 450° C. and although heating element 12 is provided for purposes of control, little actual power to the heater will be required due to the carry-over of heat from the adjacent reaction zone 16. Though the temperatures of the reaction zone and first and second temperature zones have been stated to be 1100° C., 450° C., and 200° C., respectively, it will, of course, be apparent that these values refer to the temperatures existing at approximately the mid-region of each of the zones.

In the first temperature zone, the arsenic vapor commences to solidify due to the lowering of the temperature of the gaseous mixture below the sublimation point of arsenic, and crystalline elemental arsenic is deposited at the downstream end of the first temperature zone 17 upon the walls of the deposition tube 19. This deposition tube is fitted over the funnel-shaped projection 27 so that very little or no arsenic will be deposited upon the walls of the reaction tube.

After leaving the first temperature zone, the gaseous mixture passes into the second temperature zone where it is further cooled to about 200° C. This temperature is sufficiently high to avoid the condensation of all of the components of the gaseous mixture but low enough to allow that portion of the elemental arsenic which has been carried over as a gas from the first temperature zone to sublime to the solid state. Practically all of the latter is deposited as a crystalline solid upon the walls of the deposition tube in the second temperature zone.

The exhaust gases from the reaction pass through the exhaust gas conduit 23 and into a double necked exhaust flask 24 where they filter through a mass of glass wool which removes any powdered arsenic swept out of the reaction tube. They are then passed through a water scrubber 26 where HCl and unreacted arsenic trichloride are removed. The hydrogen may then be burned off or recirculated through the purification system.

After a considerable amount of hydrogen has been passed through the reaction tube 6 and the reaction has proceeded for some time, the deposit of metallic arsenic in the deposition tube will reach sufficient size to require its removal. Thus, the process involves a batch operation. To remove the arsenic deposit, the flow of hydrogen and AsCl₃ are stopped, the system is purged with helium, and the exhaust gas conduit 23 is pulled away from its seal with the end of the reaction tube 6. To facilitate this movement, the exhaust flask 24 and the remaining parts of the apparatus train are mounted on an easily movable base by suitable means (not shown) so as to be slidable with the conduit 23. The deposition tube 19 is then slid out of the reaction tube, and the cap 19b removed so as to enable the quick and simple quantitative removal of the arsenic deposit.

To carry out another run the cap 19b is inserted in the larger segment 19a of the cylindrical deposition tube and the tube re-inserted into the reaction tube 6 in the manner disclosed in FIGURE 1 of the drawing.

If the longitudinally split deposition tube which actually comprises two semi-cylindrical halves is used, it is slid out as in the case of the preferred embodiment and the two halves are separated for ease of removing deposited arsenic. When using this tube, which is illustrated in FIGURE 3, the two halves of the tube are held in abutting relationship by the graphite liners which would be used in lieu of quartz support tab 20 of FIGURE 2 and would be located approximately centered in temperature zone 17 and temperature zone 18 of FIGURE 1.

In the above description of the apparatus, all elements of the preferred embodiment can be made of quartz or fused silica to avoid contamination of arsenic by the apparatus.

In the deposition tube of the preferred embodiment having a removable cap as described above the longitudinal circumferential segment may range in size from 25% to 90% of the total length of the deposition tube, and may generally be disposed midway between the ends of said tube. It is preferred that the length of the segment equal ½ of the total length of the deposition tube. It is important that the segment which is cut away from the cylindrical deposition tube to form a cap circumscribe approximately 180° of arc in order that the deposited arsenic may be freely removed without interference from overhanging lips which otherwise would exist.

In actual practice it has been found that the portion of the reaction tube defining the reaction zone may suitably be 45 mm. in diameter and 12 inches in length. The portion of the reaction tube surrounding the first and second condensation zones may be 24 inches in length and 2 inches in diameter. The deposition tube may be a little over 24 inches in length and 35 mm. in diameter.

Obviously many modifications and variations of the present invention are possible in the light of the above teachings. It is, therefore, to be understood that within the scope of the appended claims, the invention may be practiced otherwise than as specifically described.

What is claimed is:

1. Apparatus for reducing a metallic compound to elemental metal comprising a reaction tube, means holding deposits of elemental metal produced by a reduction reaction and disposed within said reaction tube, said holding means comprising a cylindrical tube having a longitudinal circumferential segment removably mounted therein, and means for introducing a mixture of reducing gas and metallic compound to be reduced to said reaction tube in controlled amounts.

2. Apparatus for reducing arsenic trichloride to elemental arsenic comprising a cylindrical reaction tube, a cylindrical deposition tube of shorter length and lesser diameter than said cylindrical reaction tube disposed within said reaction tube, said cylindrical deposition tube having a longitudinal circumferential segment removably mounted therein, said reaction tube defining at one of its ends a zone for mixing a reducing gas with said arsenic trichloride and defining a reaction zone between said mixing zone and said deposition tube, said deposition tube defining a first temperature zone and a second temperature zone, a first heat control means adjacent said mixing zone whereby said arsenic trichloride may be vaporized, a second heat control means disposed adjacent said reaction zone for promoting said reduction reaction, a third heat control means disposed adjacent said first temperature zone for maintaining the temperature of said zone below the sublimation point of arsenic, a fourth heat control means disposed adjacent said second temperature zone and means for introducing a controlled amount of arsenic trichloride into said mixing zone.

3. The apparatus of claim 2 wherein said segment is of semicircular cross section, is of about one half the total length of the deposition tube and is disposed about midway between the ends of said tube.

4. Apparatus for producing high purity arsenic metal comprising a cylindrical quartz tube, said tube defining at one end a zone for mixing purified hydrogen gas with gaseous arsenic trichloride and defining a reaction zone and two temperature zones intermediate its length, an exhaust gas conduit, means joining an end of said conduit to the end of said reaction tube opposite the end defining said mixing zone, said joining means comprising a concave flange on said conduit end and a convex flange on said reaction tube end, said convex flange fitting within said concave flange to form a seal, a quartz deposition tube of lesser diameter than said reaction tube and approximately coextensive in length with said two temperature zones, said deposition tube disposed within said reaction tube in registry with said temperature zones, filtering means for separating solid particles of arsenic from the exhaust gases of the reaction and connected to said exhaust gas conduit, supply means for supplying a controlled amount of arsenic trichloride to said mixing zone, and heating means for independently heating said mixing, reaction and temperature zones.

5. The apparatus of claim 4 wherein said deposition tube has a longitudinal circumferential segment removably mounted therein.

6. The apparatus of claim 4 wherein said deposition tube consists of two symmetrical, semi-cylindrical, longitudinal segments maintained in abutting relationship removably mounted therein.

7. Apparatus for producing high purity arsenic metal comprising a cylindrical quartz tube, said tube defining at one end a zone for mixing purified hydrogen gas with gaseous arsenic trichloride and defining a reaction zone and two temperature zones intermediate its length, a quartz deposition tube of lesser diameter than said reaction tube and approximately coextensive in length with said two temperature zones, said deposition tube disposed within said reaction tube in registry with said temperature zones, filtering means for separating solid particles of arsenic from the exhaust gases of the reaction and supply means for supplying a controlled amount of arsenic trichloride to said mixing zone; the improvement in combination therewith comprising an exhaust gas conduit, means joining an end of said conduit to the end of said reaction tube opposite its end defining said mixing zone, said joining means comprising a concave flange on said conduit and a convex flange on said reaction tube end, said convex flange fitting with said concave flange to form a seal.

8. In an apparatus for reducing a metallic compound to elemental metal comprising a reaction tube, means for holding deposits of elemental metal produced by reduction reaction and disposed within said reaction tube, means for introducing a mixture of reducing gas and metallic compound to be reduced to said reaction tube in controlled amounts; the improvement in combination therewith comprising providing as said holding means a cylindrical tube separable into two symmetrical, semi-cylindrical sections.

9. Apparatus for reducing arsenic trichloride to elemental arsenic comprising a cylindrical reaction tube, a cylindrical deposition tube of shorter length and lesser diameter than said cylindrical reaction tube disposed within said reaction tube, said cylindrical deposition tube being two symmetrical, semi-cylindrical, longitudinal segments removably mounted therein, said reaction tube defining at one of its ends a zone for mixing a reducing gas with said arsenic trichloride and defining a reaction zone between said mixing zone and said deposition tube, said deposition tube defining a first temperature zone and a second temperature zone, a first heat control means adjacent said mixing zone whereby said arsenic trichloride may be vaporized, a second heat control means disposed adjacent said reaction zone for promoting said reduction reaction, a third heat control means disposed adjacent said first temperature zone for maintaining the temperature of said zone below the sublimation point of arsenic, a fourth heat control means disposed adjacent said second temperature zone and means for introducing a controlled amount of arsenic trichloride into said mixing zone.

References Cited in the file of this patent

UNITED STATES PATENTS

| | | |
|---|---|---|
| 344,139 | Seaman | June 22, 1886 |
| 2,387,677 | Pidgeon | Oct. 23, 1945 |
| 2,441,603 | Storks et al. | May 18, 1948 |
| 2,486,775 | Barber | Nov. 1, 1949 |
| 2,778,726 | Winter et al. | Jan. 22, 1957 |
| 2,814,477 | Loomis et al. | Nov. 26, 1957 |